US010297127B1

(12) United States Patent
Hardt et al.

(10) Patent No.: US 10,297,127 B1
(45) Date of Patent: May 21, 2019

(54) HOME SECURITY SYSTEMS AND BLUETOOTH WI-FI EMBEDDED SET-TOPS AND MODEMS (71) Applicant: ARRIS Enterprises LLC, Suwanee, GA (US)

(72) Inventors: Charles Hardt, Lawrenceville, GA (US); Dmitry Barablin, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/845,726

(22) Filed: Dec. 18, 2017

(51) Int. Cl.
| G08B 13/22 | (2006.01) |
| G08B 3/10 | (2006.01) |
| H04N 21/233 | (2011.01) |
| H04N 21/41 | (2011.01) |
| H04N 21/436 | (2011.01) |

(52) U.S. Cl.
CPC ............ *G08B 13/22* (2013.01); *G08B 3/10* (2013.01); *H04N 21/233* (2013.01); *H04N 21/4131* (2013.01); *H04N 21/43615* (2013.01)

(58) Field of Classification Search
None
See application file for complete search history.

(56) References Cited

U.S. PATENT DOCUMENTS

| 4,827,458 A * | 5/1989 | D'Alayer de Costemore D'Arc ...................... G08B 3/10 340/566 |
| 5,172,408 A * | 12/1992 | Petty ....................... H04M 9/08 379/215.01 |
| 6,301,490 B1 * | 10/2001 | Callan .................... H04B 1/385 379/430 |
| 7,843,865 B2 * | 11/2010 | Kumar ............... H04N 21/4223 370/312 |
| 8,175,516 B2 * | 5/2012 | Nakao .................... H04H 60/32 455/3.02 |
| 8,380,159 B2 * | 2/2013 | Sennett ................... H04W 4/90 455/404.1 |
| 9,942,667 B2 * | 4/2018 | Ungstrup ............. H04R 25/554 |
| 2005/0117569 A1 * | 6/2005 | Aoyagi ............. H04L 29/06027 370/352 |
| 2005/0132420 A1 * | 6/2005 | Howard .................. G06F 3/017 725/135 |
| 2011/0080292 A1 * | 4/2011 | Tomoda .................. G08B 7/00 340/573.1 |

(Continued)

*Primary Examiner* — John F Mortell
(74) *Attorney, Agent, or Firm* — Larry T. Cullen (57) ABSTRACT

An audio aggregation point is established, e.g., in a set-top, to aggregate audio alerts from a home security system and other Internet of Things (IoT) type devices that output digital audio alert streams. The aggregated audio is combined with a media audio stream, and provided to a personal hearing aid or other personal listening device such as a headset. The audio aggregation point communicates with the home security system and other IoT type devices over Bluetooth or Wi-Fi interfaces. The hearing aid preferably communicates with the audio aggregation point via a Bluetooth interface. The audio aggregation point provides audio alerts (e.g., a beeping alert of a door opening) from the home security system and IoT type devices directly into the digital audio stream otherwise already being digitally transmitted to a hearing aid or other personal hearing device or headset.

21 Claims, 10 Drawing Sheets (56) References Cited

U.S. PATENT DOCUMENTS

| | | | | |
|---|---|---|---|---|
| 2013/0031192 A1* | 1/2013 | Caspi | ............... | H04L 65/1069 709/206 |
| 2015/0208161 A1* | 7/2015 | Lesaffre | ............ | H04N 21/4126 381/74 |
| 2015/0317889 A1* | 11/2015 | Kawasaki | ............. | H04H 20/61 348/152 |
| 2015/0326628 A1* | 11/2015 | Baird | ................ | H04L 67/02 715/720 |
| 2015/0373467 A1* | 12/2015 | Gelter | ................ | H04R 29/00 381/56 |
| 2016/0330538 A1* | 11/2016 | Eskenas | ............. | G08B 3/00 |

* cited by examiner

HOME SECURITY SYSTEMS AND BLUETOOTH WI-FI EMBEDDED SET-TOPS AND MODEMS

BACKGROUND OF THE INVENTION

1. Field of the Invention

The present disclosure relates to a system and method to directly include alerts issued by home security systems.

2. Background of Related Art

Installations of home security systems continue to proliferate, with most newly constructed dwelling units having security systems installed by default. One key feature of many security systems is that any time a window or a door in the secured space is opened, the security system will generate an audio alert (e.g., a triple beeping audio tone) to let anyone in the house know that the event occurred.

Unfortunately, individuals that are hearing impaired may not be able to hear the audio alert, and therefore may be unaware of the audio alert that a door or window has been opened.

Moreover, while systems exist to pass an alert such as an Amber Alert over a public network to a user's smartphone, a hearing impaired person may not be audibly alerted to such an alert unless that hearing impaired person is wearing a personal hearing device that is plugged into their smartphone. However, this is not always the case as the personal hearing device may be dedicated to another device at that moment, e.g., connected to the audio output of a stereo or television.

SUMMARY OF THE INVENTION

The present invention provides an electronic apparatus, such as a set-top box, including a video stream demultiplexing system to provide video media to a media device such as an HDMI television. The electronic apparatus further includes an audio aggregation point comprising a plurality of wireless (e.g., Bluetooth, ZigBee) interfaces adapted for synching to an Internet of Things (IoT) device capable of outputting a digital audio stream containing an alert tone. A wireless (e.g., Bluetooth) headset interface is adapted for synching with a wireless-capable hearing device. A digital audio aggregation device, in communication with the plurality of wireless interfaces and the wireless headset interface, digitally aggregates an audio stream provided by each of the plurality of wireless interfaces, and outputs the digitally aggregated audio stream to the wireless headset interface.

In accordance with another aspect of the invention, a method of aggregating a plurality of digital audio streams for providing directly to a personal hearing device of a user comprises synching, via respective wireless interfaces, to a plurality of Internet of Things (IoT) type devices capable of outputting an audio stream containing an alert tone, and synching, via a wireless headset interface, to a wireless capable hearing device. A digital audio stream provided by each of the plurality of IoT devices is aggregated to create an aggregated digital audio stream. The aggregated digital audio stream is output to the wireless capable hearing device via the wireless headset interface.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Hearing impaired individuals often already have a listening device, e.g., a hearing aid, or a standard headset when listening to audio from a specific source. With the previous generation of hearing aids, to hear a distant audio alert within a home the hearing-impaired user conventionally was limited to a manual adjustment of the volume level of their hearing aid sufficient to amplify the audible alert events surrounding them. However, this is not ideal as the technique also increases the level of background noise.

Some of the latest generation of hearing aids now optionally support either Bluetooth or Wi-Fi connections, and an industry trend in regards to set-tops and modems is to provide a direct connection between the set-top and a user's hearing aid via Wi-Fi and/or Bluetooth radio communication.

The inventors hereof have appreciated that the latest capabilities of hearing aids opens up an opportunity for interaction and communication between gateway electronic apparatuses, such as set-top boxes, modems, and hearing aids so as to enable a hearing impaired individual to directly hear audible alerts For instance, the inventors have recognized that many home security systems support Wi-Fi and/or Bluetooth connected security devices. In accordance with the principles of the present invention, a hearing impaired user is alerted directly by an audio tone generated by their security system or IoT type devices through direct Bluetooth or Wi-Fi connection of their Bluetooth or Wi-Fi enabled hearing aid or headset, with a set-top including an audio aggregation point.

While disclosed with respect to specific embodiments of a home security system, the present invention relates equally to any device which would generate an audio tone that a hearing person would be expected to hear, and which is synched via a Bluetooth or other type piconet, or via Wi-Fi, or via the Internet, to an audio aggregation point.

Figure 1:
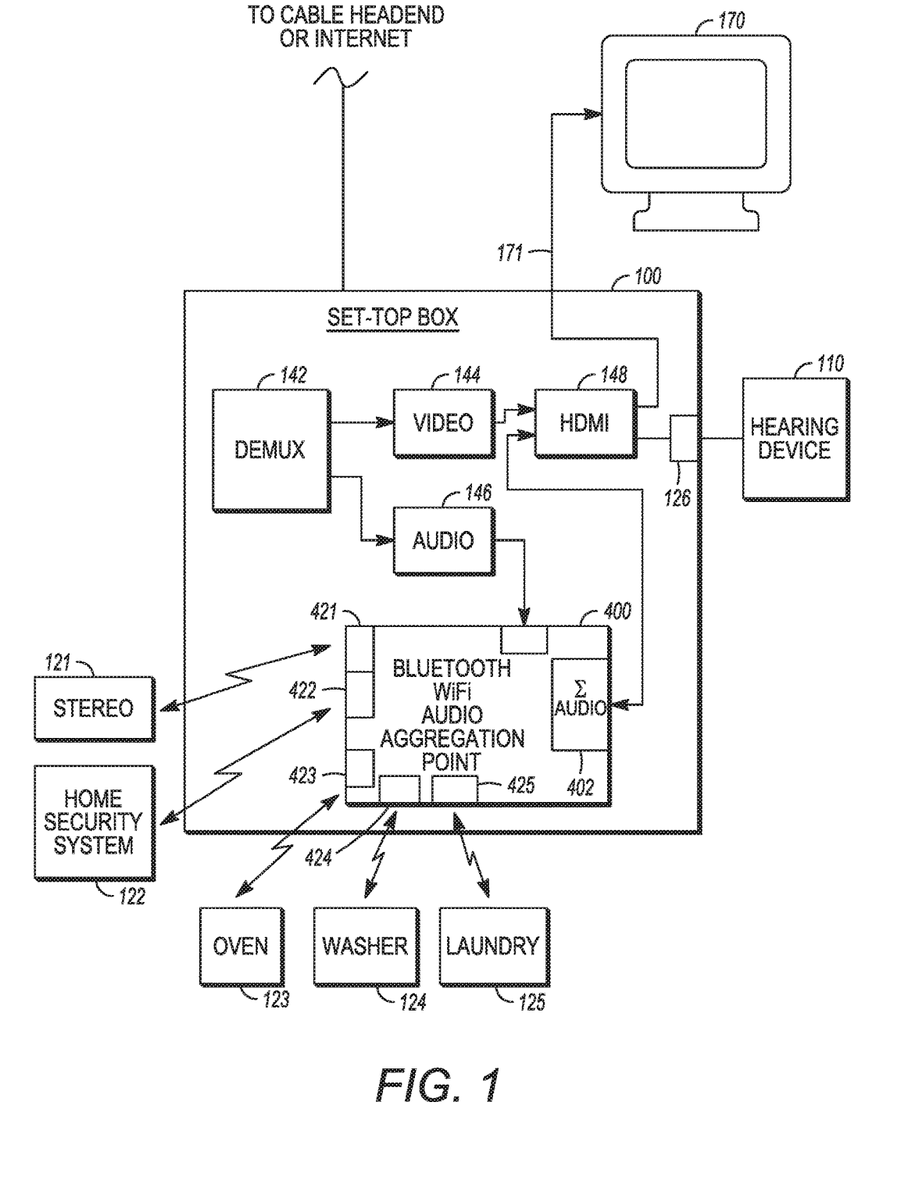
FIG. 1 shows a set-top box including a Bluetooth and Wi-Fi audio aggregation point which syncs with a home security system and/or a plurality of Bluetooth or Wi-Fi capable IoT type devices within a home that provide an audio alert.

FIG. 1 shows an example of an electronic apparatus in the form of a set-top box (i.e., set-top) 100 including a Bluetooth and Wi-Fi audio aggregation point 400 which syncs with a home security system 122 and any/all of a plurality of Bluetooth or Wi-Fi capable devices such as Internet of Things (IoT) type devices 121-125 within a home that provide an audio alert, in accordance with the principles of the present invention. Those of skill in the art will appreciate that IoT devices are generally devices which communicate monitoring or control information to other devices (such as a host or network controller which may be remotely located from the reporting device or located in the premises as the reporting device) using standardized Internet Protocol ("IP") communications. The wireless communication scheme is not limited to Bluetooth or WiFi and any wireless communication scheme of low or medium range is contemplated.

As shown in FIG. 1, a set-top (or Home Network End Device "HNED" or modem) 100 is connected to cable service equipment in association with a cable headend (not shown). While the invention is shown and described with respect to a cable headend, the invention relates equally to streaming services from an Internet source to a suitable Ethernet connection, wired or wireless.

The set-top or modem 100 forms an audio aggregation point in the home, with a home security system 122 or other Internet of Things (IoT) type devices 121, 123-125 communicating with an audio aggregation point 400 in the set-top or modem 100. By use of the term "other Internet of Things (IoT) type devices", the invention recognizes that other devices within the home that output an audible alerts can potentially be implemented so long as they communicate the audible alert over a Bluetooth or Wi-Fi connection. In other embodiments, interconnection over the Internet is contemplated. Other IoT type devices include, e.g., washing machines, stoves, ovens, dishwashers, etc. For the purposes of the disclosed embodiments, it is assumed that each of the aforementioned IoT devices generates a digital audio alert stream such as an audio alert to notify occupants of the home of some situation (e.g., that a bake time has expired, that the wash cycle has ended, etc.) and provides the same digital audio alert stream by wireless communication, e.g., Bluetooth or Wi-Fi, connection.

In accordance with the principles of the present invention, the set-top or modem 100 further includes an audio aggregation point (AP) 400 to sync with and collect digital audio alert streams from devices such as a home security system 122 or IoT type devices (e.g. stereo 121, oven 123, washer 124, laundry 125). The audio aggregation point 400 mixes the audio alerts directly into the digital audio stream otherwise already being digitally transmitted to a hearing aid or other personal hearing device or headset 110 upon the occurrence of a security event (e.g., when a door opens).

The present invention eliminates the need for the hearing-impaired user from having to increase the volume level of their hearing aid or headset 110 to otherwise be capable of hearing a distant external audible alert.

Moreover, where any headset user is committed to a one-to-one audio experience from their set-top 100 and are somewhat isolated from external sounds, home security system and other digital audio alerts are aggregated (mixed) and injected into the digital audio stream being provided to the headset 110.

In disclosed embodiments, conventional home security systems 122 and conventional Internet of Thing (IoT) type devices 121, 123-125 communicate audio alerts to the inventive audio aggregation point 400 in a set-top or modem 100, wirelessly e.g. over respective Bluetooth or Wi-Fi interfaces 421-425. While shown with respect to Bluetooth or Wi-Fi connection to the audio aggregation point 400 within a set-top, the present invention relates equally to the use of the Internet (wired or wireless) to provide interconnection from the home security system 122 and/or IoT type devices 121, 123-125, to the audio aggregation point 400 in the set-top 100. In the case of Internet interconnectivity, audio alerts are directly (or indirectly via a dedicated server) routed over the Internet to the appropriate set-top 100 including an audio aggregation point 400 that aggregates digital audio for a hearing aid or headset 110 of a given user within the relevant home.

In accordance with the present invention, hearing aids 110 that support digital audio streaming are paired (via e.g. Bluetooth or Wi-Fi) with a set-top or modem 100, and are provided with the digital audio output from an audio aggregation point 400. The audio aggregation point 400 sums or aggregates the digital audio from a plurality of audio sources such that audio alert events are streamed or otherwise forwarded to the hearing aid directly from the set-top or modem 100. For instance, the audio aggregation point 400 aggregates (i.e., sums) digital audio streams input from, e.g., an entertainment source, video game, widget, and/or other program. Also provided as digital audio input to the audio aggregation point 400 are audio alerts from a home security system 122 and/or IoT type devices 121, 123-125 synched to the set-top 100 via Bluetooth or Wi-Fi.

Referring again to FIG. 1, the set-top 100 otherwise conventionally provides entertainment video and audio streams to an HDMI sink device such as a television 170, e.g., via digital HDMI connection via an HDMI interface 148 in the set-top 100. The set-top 100 communicates with the HDMI sink device such as the television 170 over an HDMI cable 171 connecting the HDMI interface 148 in the set-top 100 to an appropriate HDMI interface in the HDMI sink device 170. A user instructs the set-top box 100 through a visual display on the television 170 using an infrared or wireless remote control (not shown).

The set-top 100 outputs an aggregated digital audio stream to a personal hearing device (e.g., hearing aid or, headset) 110 via an appropriate Bluetooth or Wi-Fi interface 126.

Conventional sync techniques may be implemented to sync the personal hearing device 110 with a Bluetooth (or Wi-Fi interface) 126 of the set-top 100, as will be understood by those of skill in the art.

An additional plurality of Bluetooth or Wi-Fi interfaces 421-425 are implemented within the audio aggregation point 400. The Bluetooth or Wi-Fi interfaces 421-425 may be used to each sync with a particular one of various devices within the home that provide an audio alert, e.g., a home security system 122, an oven 123, a washer 124, a laundry 125, and even a stereo 121. While the set-top 100 is shown with five Bluetooth or Wi-Fi interfaces within the audio aggregation point 400, the invention is equally applicable to any plurality of Bluetooth or Wi-Fi interfaces. Moreover, the audio aggregation point 400 may implement only Wi-Fi interfaces, or only Bluetooth interfaces, within the principles of the present invention.

The set-top 100 includes otherwise standard functionality, including a demultiplexer 142 to receive a transport stream from a cable headend or Internet service, and demultiplex the contents of the received transport stream to provide a selected video stream 144 and associated audio stream 146 to the HDMI interface 148 for transmission to the HDMI sink device 170 via HDMI. While disclosed with HDMI connection to the television 170, other digital transmission protocol, including wireless communication, of a video from the set-top 100 to the television 170 is within the principles of the invention.

The digital audio aggregation point 400 includes a digital audio mixer 402, which mixes otherwise conventional digital audio (e.g., digital audio 146 from the entertainment stream) with digital audio streams of audio alerts provided by any or all of the IoT type devices such as the home security system 122, oven 123, washer 124, laundry 125 and stereo 121. Preferably the digital audio is of a common format, e.g., MP3 digital audio, while conversion of any/all audio sources into a common digital audio format is within the principles of the present invention.

While disclosed embodiments relate to use in a set-top box (or Home Network End Device "HNED"), the principles apply equally to use within any consumer entertainment device with audio output for the hearing-impaired.

Figure 2A:
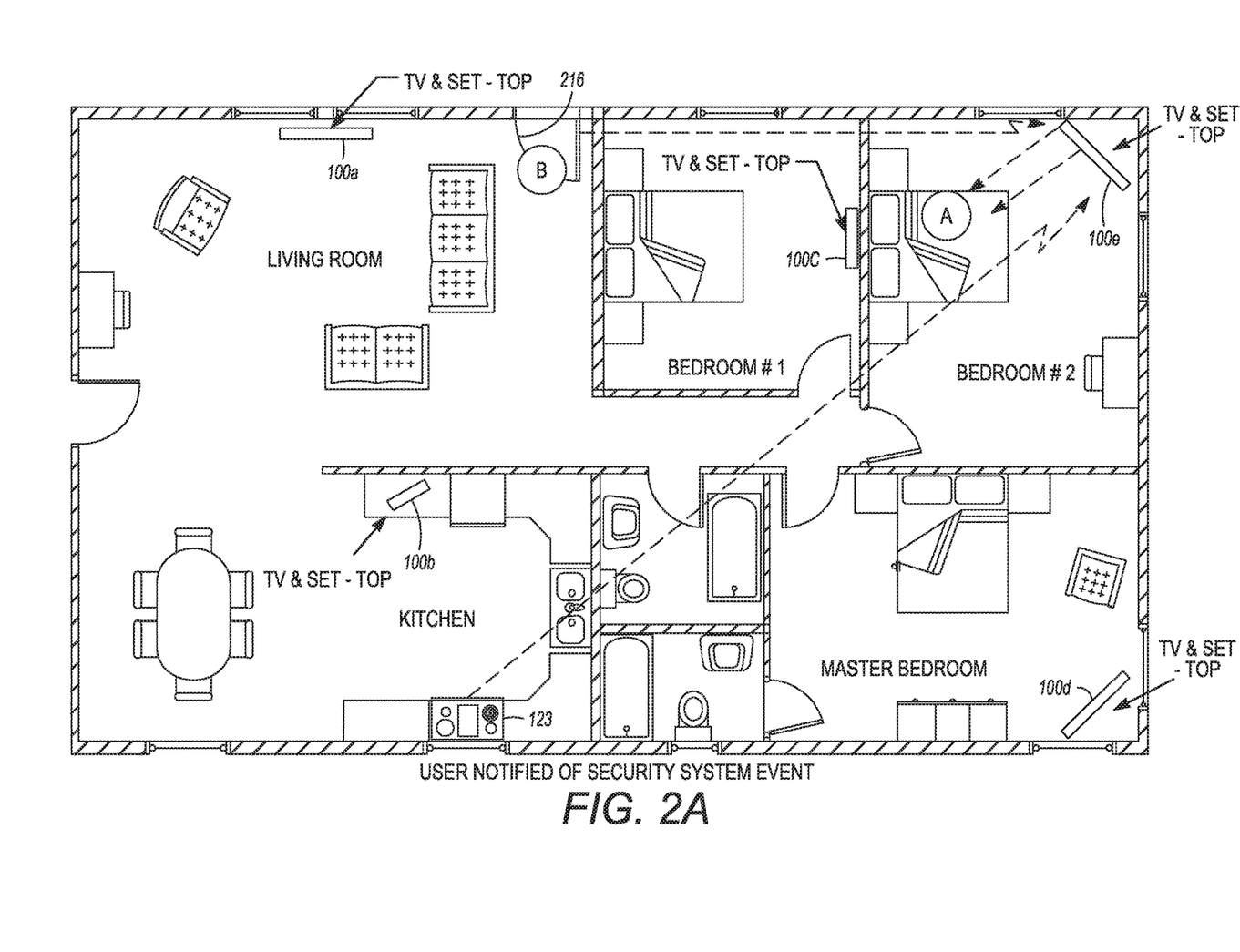
FIG. 2A depicts an exemplary home including a home security system synched with a set-top box as shown in FIG. 1.

FIG. 2A depicts an exemplary home including a home security system synched with a set-top box as shown in FIG. 1.

In particular, as shown in FIG. 2A, a floor plan of an exemplary home shows a plurality of set-tops 100a-100e disbursed in various rooms of the house. For purposes of this embodiment, each of the set-tops 100a-100e are just as shown and described with reference to 100 in FIG. 1. Also for the purposes of explaining this particular embodiment, set-top 100e in the back Bedroom #2 is turned on and synched with user "A"'s hearing aid such that user "A" is watching and listening to a television program via set-top 100e.

Thus, the hearing impaired user "A" sits in a Bedroom #2 watching a TV connected to a set-top 100e. The hearing impaired user "A" wears a conventional Bluetooth hearing aid that is synched via Bluetooth communication with the appropriate Bluetooth interface 126 (as shown in FIG. 1) of a particular set-top 100e. The hearing impaired user "A" need not be watching an entertainment show on the television associated with set-top 100e for the purposes of explanation of the invention. Rather, in the given embodiment, the set-top 100e to which the user "A" is synched need only be powered ON and providing aggregated digital audio to the hearing aid or headset 110 of user "A".

In FIG. 2A, while the hearing aid or headset 110 of user "A" is synched to set-top 100e, the home security system is activated by the opening of a front door 216. As is known in conventional home security systems 122, a detector on the front door 216 activates to alert the home security system 122, which outputs an audible tone when the front door 216 is opened.

As shown in FIG. 2A, a person "B" opens the front door 216, causing the home security system to detect that the front door 216 was opened. At this point, an audible alert is conventionally output by the home security system 122 in the otherwise conventional fashion.

Importantly however, the home security system 122 (which includes the sensor for the front door 216) is synched with the set-top 100e via an appropriate Bluetooth or Wi-Fi interface. In accordance with the principles of the present invention, over the Bluetooth or Wi-Fi interface, the home security system 122 directly provides a digital audio stream of the audible alert tone that was audibly output by the home security system (e.g., wirelessly transmitted) to any/all set-tops that it is/are synched with (e.g., set-top 100e) via an appropriate Bluetooth or Wi-Fi interface 422 (as shown in FIG. 1). The audio alert that the home security system 122 provides in digital streaming form to the set-top 100e is input to the audio aggregation point 400, where the audio alert is digitally aggregated (i.e., mixed) with the audio stream 146 already being output via Bluetooth interface 126 (FIG. 1) to user "A"'s personal hearing device or headset 110. In this way, the synched hearing aid or headset 110 of user "A" is provided directly with the audio alert from the home security system 122, in addition to any audio that the synched hearing aid or headset 110 may have otherwise been listening to (e.g., a media stream, or audio alerts from other IoT type devices.)

Figure 2B:
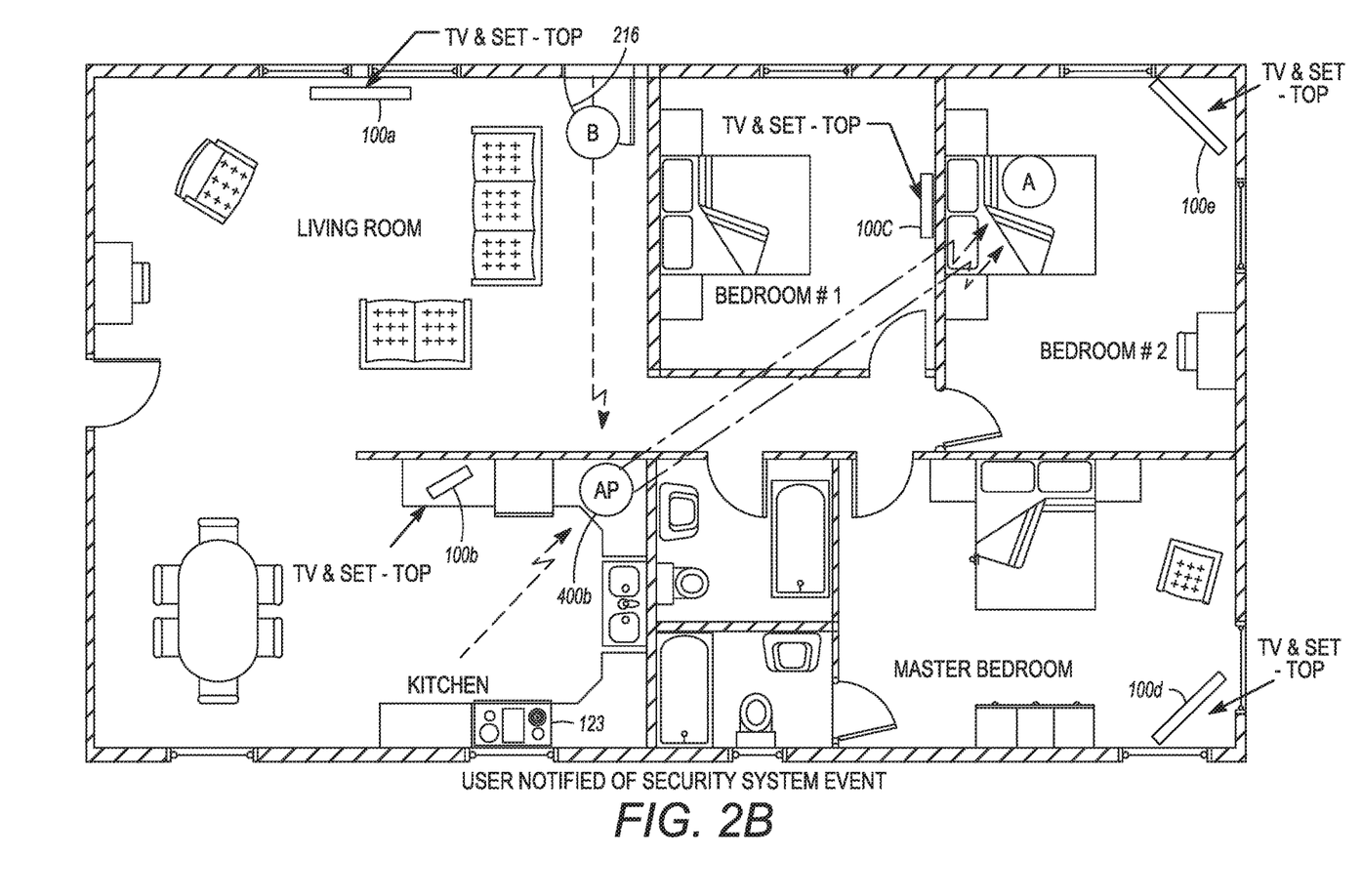
FIG. 2B depicts an exemplary home including a home security system synched with a separate Bluetooth and Wi-Fi audio aggregation point.

FIG. 2B depicts an exemplary home including a home security system synched with a separate audio aggregation point (AP) 400b.

In particular, FIG. 2B shows another embodiment wherein the audio aggregation point 400 shown in FIG. 1 is a separate device separate from the set-top 100e (depicted in FIG. 2B as item 400b). As shown, the audio aggregation point 400b has established Bluetooth or Wi-Fi communication with the home security system 122 and other IoT type devices (such as the oven 123). The audio aggregation point 400b is also synched with the Bluetooth hearing aid or headset 110 worn by user "A" so as to provide aggregate digital audio to the user "A".

Figure 3:
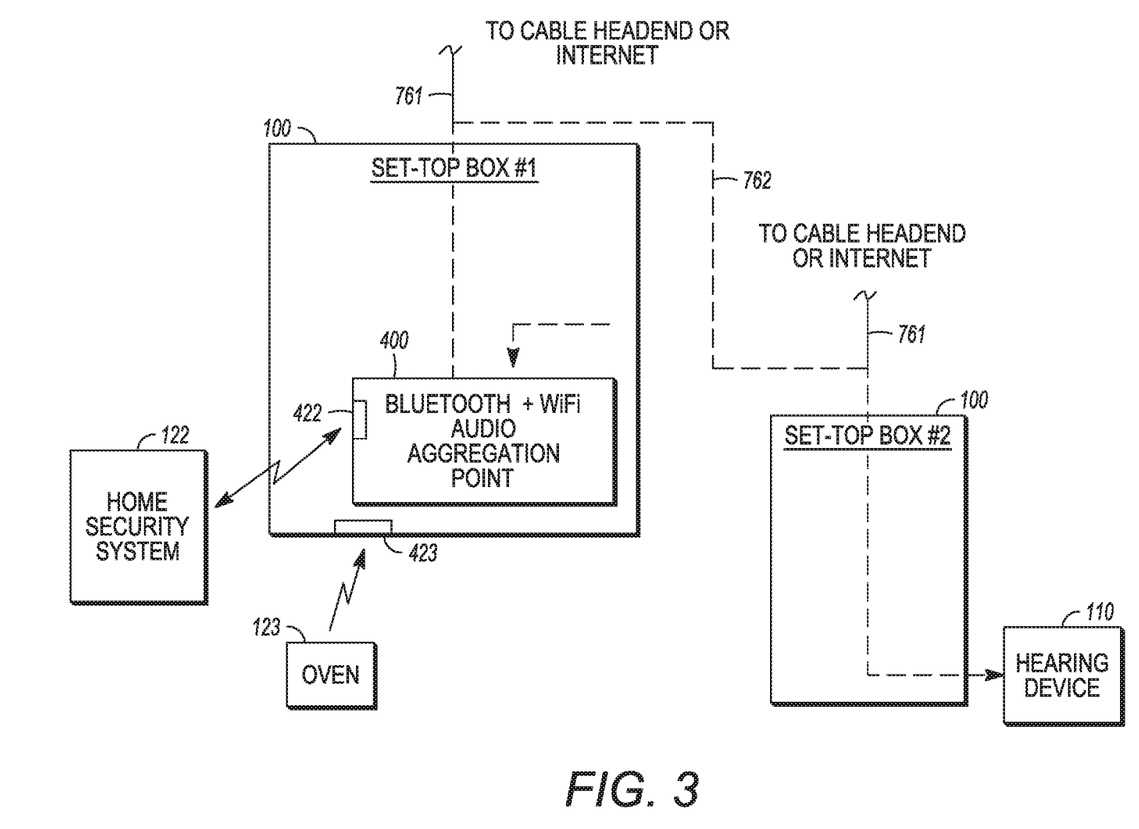
FIG. 3 shows communication, either local or via the Internet, between one set-top synched with a hearing aid or other personal hearing device, and another set-top including a Bluetooth and Wi-Fi audio aggregation point in synched Bluetooth or Wi-Fi communication with a home security system and other Internet of Thing (IoT) type devices such as an oven to receive audible alerts.

FIG. 3 shows communication, either local or via the Internet, between one set-top 100 synched via Bluetooth interface with a hearing aid, headset or other personal hearing device 110, and another set-top 100 including an audio aggregation point 400 in synched communication with a home security system 122 and other Internet of Thing (IoT) type devices such as an oven 123. The one set-top 100 communicates with the other set-top 100 (as depicted by dotted line 762) via known systems and methods either over the cable 761, or over Ethernet to the Internet.

As shown in FIG. 3, a digital audio stream from the home security system 122 and other IoT type devices 123 may be aggregated at just one audio aggregation point 400 within one set-top 100 within a home, with the already aggregated audio stream communicated to the other set-tops 100 around the home. In this way, as the hearing impaired user moves about the house and resyncs with various different set-tops 100 within the home, the hearing aid or headset 110 of the hearing impaired user continues to receive a consistent aggregated audio stream.

Figure 4A:
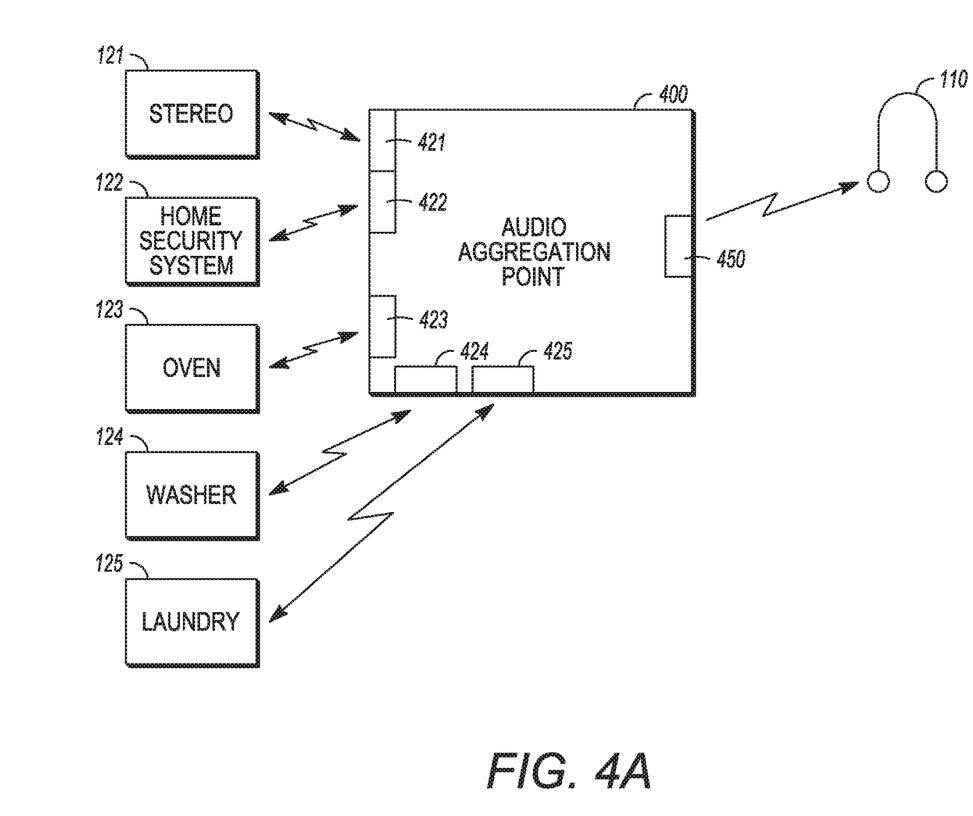
FIG. 4A shows relevant elements of an audio aggregation point with digital output to a Bluetooth interface synched with a hearing aid or headset of a user.

FIG. 4A shows relevant elements of an audio aggregation point 400 with digital output to a Bluetooth interface 450 synched with a hearing aid or headset 110 of a user.

In particular, as shown in FIG. 4A, the audio aggregation point 400 includes a plurality of Bluetooth or Wi-Fi interfaces 421-425 for synching to a home security network 122 and/or various other IoT type devices such as a stereo 121, an oven 123, a washer 124, and a laundry 125.

In the embodiment of FIG. 4A, the audio aggregation point 400 includes a Bluetooth interface 450 for synching with a Bluetooth-capable hearing aid or headset 110 of a user. The volume of the audio output by the audio aggregation point 400 may be adjusted by the set-top 100 by control of the user. Alternatively, or additionally, volume of the audio may also be adjusted by user on the Bluetooth-capable headset 110. It is also within the principles of the invention for the Bluetooth-capable headset 110 to communicate volume instruction over the Bluetooth path to the audio aggregation point 400 for the audio aggregation point 400 to adjust the volume of the audio stream being output by the audio aggregation point 400 to the headset 110.

Figure 4B:
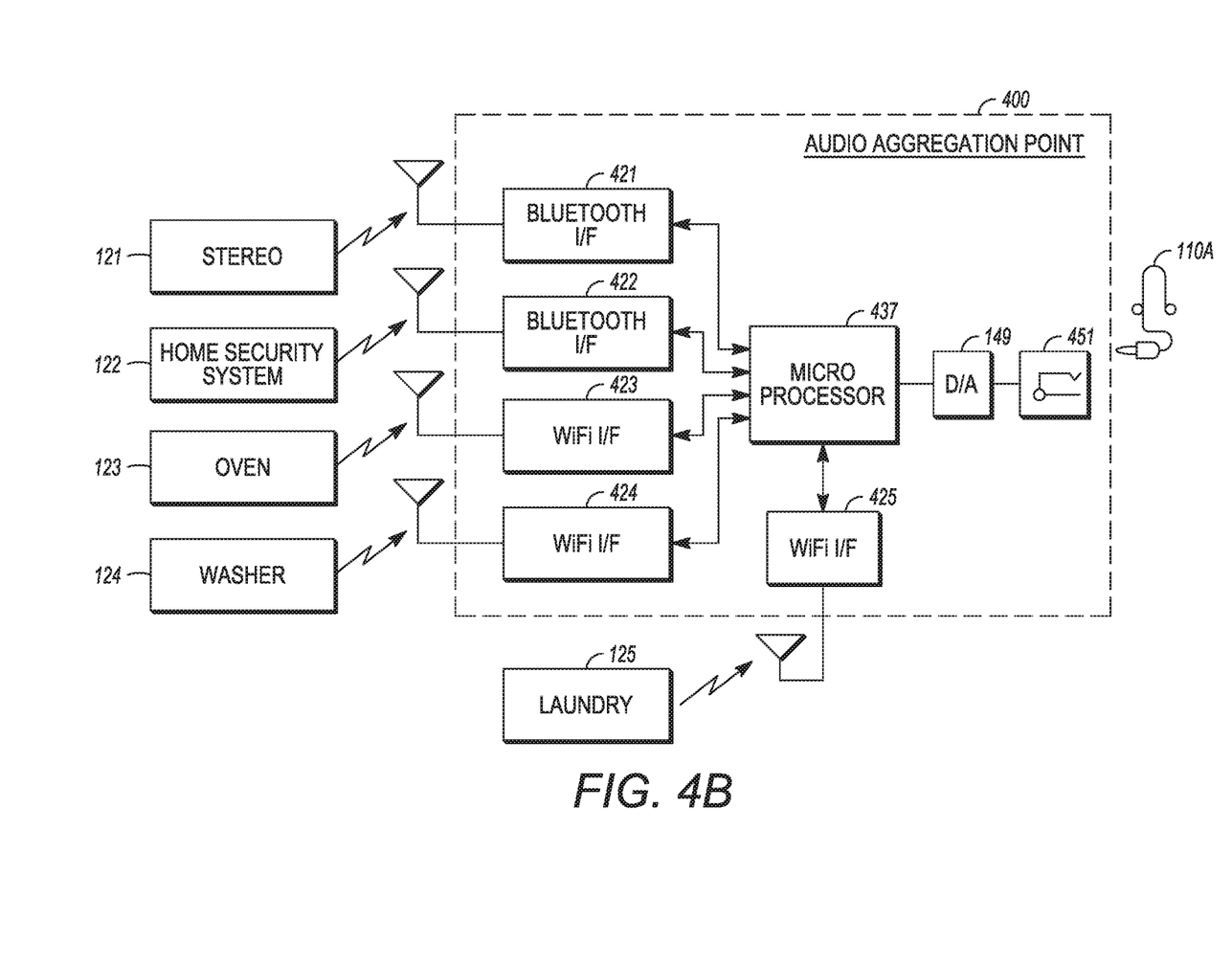
FIG. 4B shows relevant elements of an audio aggregation point with analog output to a standard phone jack.

FIG. 4B shows relevant elements of an audio aggregation point with analog output to a standard phone jack.

In particular, as shown in FIG. 4B, the audio aggregation point 400 includes a plurality of Bluetooth or Wi-Fi interfaces 421-425 for synching to a home security network 122 and/or various other IoT type devices such as a stereo 121, an oven 123, a washer 124, and a laundry 125.

In the embodiment of FIG. 4B, the audio aggregation point 400 includes an analog headset jack 451 for directly plugging an analog headset 110*a* or other analog listening device into. The audio aggregation point 400 of FIG. 4B includes a digital-to-analog (D/A) converter or codec 149 to convert the aggregated digital audio stream to an analog output of suitable level.

Figure 4C:
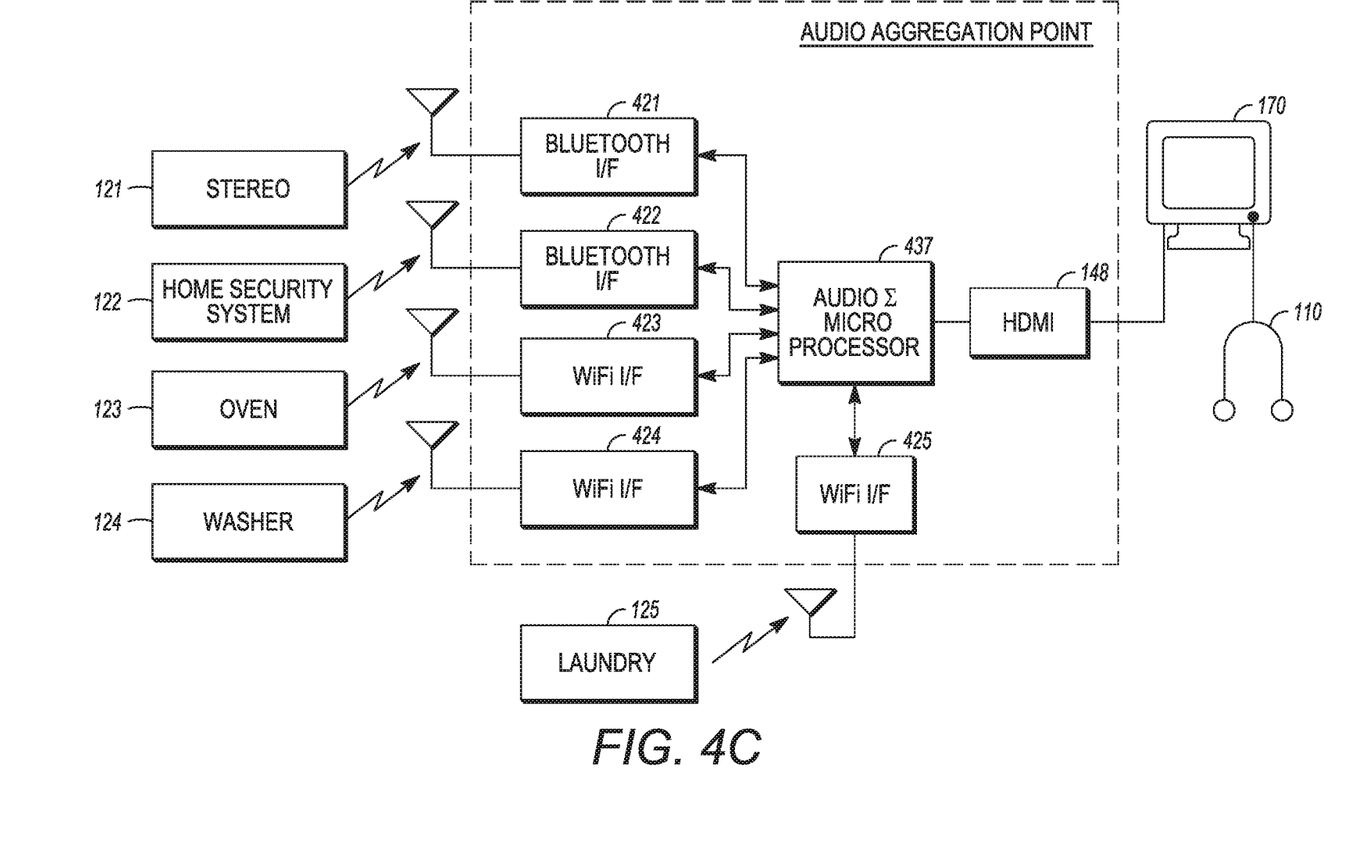
FIG. 4C shows relevant elements of an audio aggregation point with digital output, e.g., HDMI.

FIG. 4C shows relevant elements of an audio aggregation point with digital output, e.g., HDMI.

In particular, as shown in FIG. 4C, the audio aggregation point 400 includes a plurality of Bluetooth or Wi-Fi interfaces 421-425 for synching to a home security network 122 and/or various other IoT type devices such as a stereo 121, an oven 123, a washer 124, and a laundry 125.

In the embodiment of FIG. 4C, the audio aggregation point 400 includes an HDMI interface 148 for outputting an aggregated digital audio stream to an HDMI sink device such as a television 170, which in turn provides the aggregated digital audio stream over a Bluetooth or other wireless communication path to a Bluetooth-capable hearing aid or headset 110 of a user. The volume of the audio output by the audio aggregation point 400 may be adjusted by the set-top 100 under the control of the user. Alternatively, or additionally, volume of the audio may be adjusted by the television 170. Lastly, the volume may be adjusted at the Bluetooth-capable headset 110. It is also within the principles of the invention for the Bluetooth-capable headset 110 to communicate volume instruction over the Bluetooth path to the audio aggregation point 400 for the audio aggregation point 400 to adjust the volume of the audio stream being output by the audio aggregation point 400 via the HDMI interface 148.

Figure 5A:
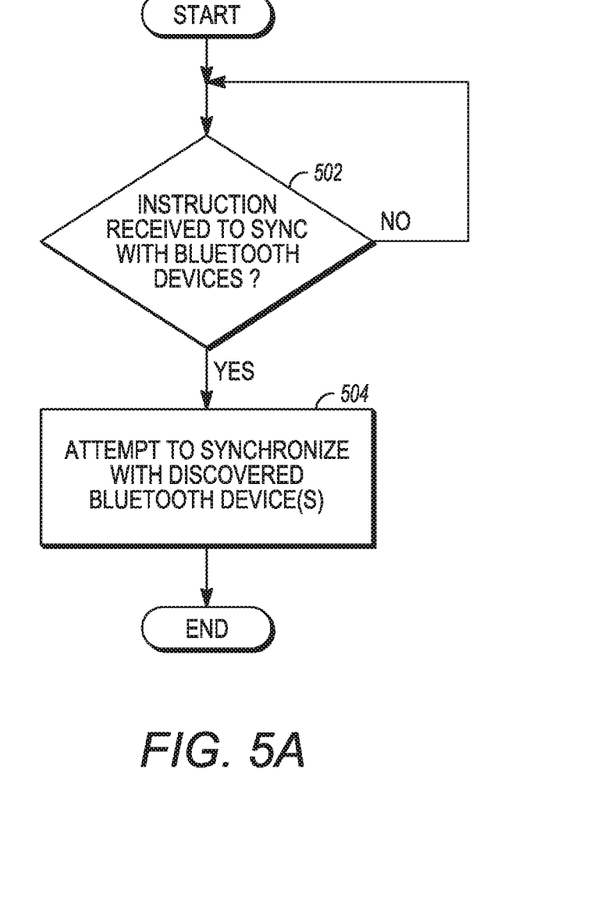
FIG. 5A shows a method of manually synching a Bluetooth device with the set-top box, via instructions input to the set-top.

FIG. 5A shows a method of manually synching a Bluetooth device with the set-top box, via instructions input to the set-top.

In particular, as shown in FIG. 5A, the processor of a set-top 100 contains programming to determine if a user has entered an instruction to cause the set-top 100 to utilize an available Bluetooth interface to sync with any discovered Bluetooth devices, as shown in step 502. If all available Bluetooth interfaces are already in sync with a device within the home, the set-top will provide an error message to the user via, e.g., the television 170. However, if the audio aggregation point 400 of the set-top 100 has an available Bluetooth port, the set-top 100 will individually attempt to sync with a first discovered Bluetooth device. If that attempt fails, an attempt will then be made to sync with a second discovered Bluetooth device, etc., until all discovered and authorized Bluetooth devices are attempted, as shown in step 504.

The process shown in FIG. 5A may be periodically or otherwise intermittently cycled through.

Conventional sync techniques may be implemented to sync the various IoT type devices 121-125 with the Bluetooth or Wi-Fi interfaces 421-425 of the audio aggregation point 400, as will be understood by those of skill in the art.

Figure 5B:
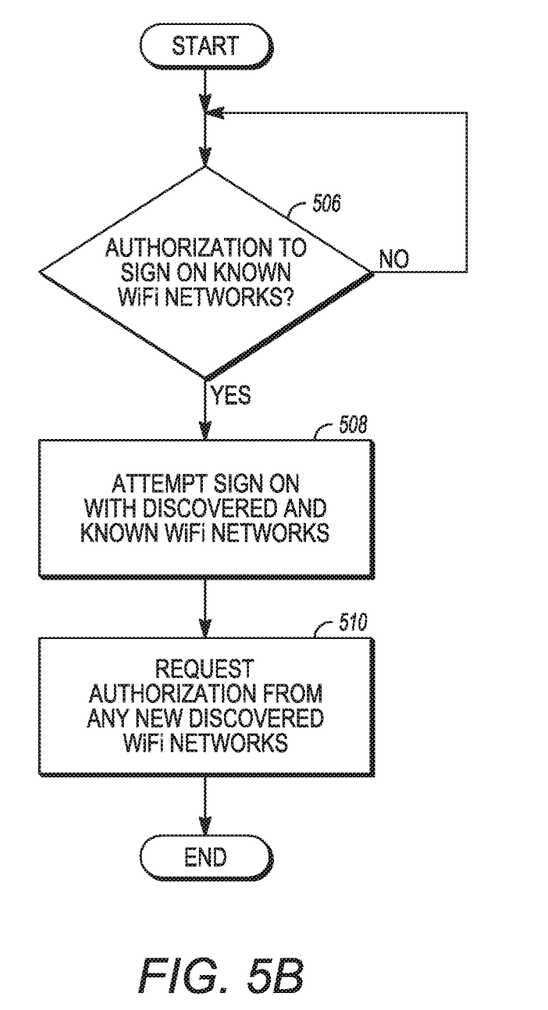
FIG. 5B shows a method of automatically synching discovered and known (i.e., authorized) Wi-Fi devices with the set-top box.

FIG. 5B shows a method of automatically synching discovered and known (i.e., authorized) Wi-Fi devices with the set-top box.

In particular, as shown in step 506 of FIG. 5B, the audio aggregation point 400 discovers all available Wi-Fi networks, and determines which available Wi-Fi networks are known to the audio aggregation point 400 or have otherwise been previously authorized for connection.

In step 508, the audio aggregation point 400 attempts to sign on discovered and known Wi-Fi networks. This represents resynching with the home security system 122 or other IoT type devices that have previously been synched with the audio aggregation point 400.

In step 509, the audio aggregation point 400 requests authorization to have any available Wi-Fi interfaces (421-425) synched with any discovered new Wi-Fi networks provided by, e.g., the home security system 122 or other IoT type devices. The authorization request and other instructions may be obtained by the set-top 100 via use of a remote control (not shown) using the video screen of the television 170 connected to the set-top.

Synchronization may be run on-demand by instruction from the user to the set-top 100, or periodically, e.g., automated sign on to Wi-Fi networks may be attempted in a cycle starting, e.g., 2 minutes after last attempt, 5 minutes after last attempt, etc.

Figure 6:
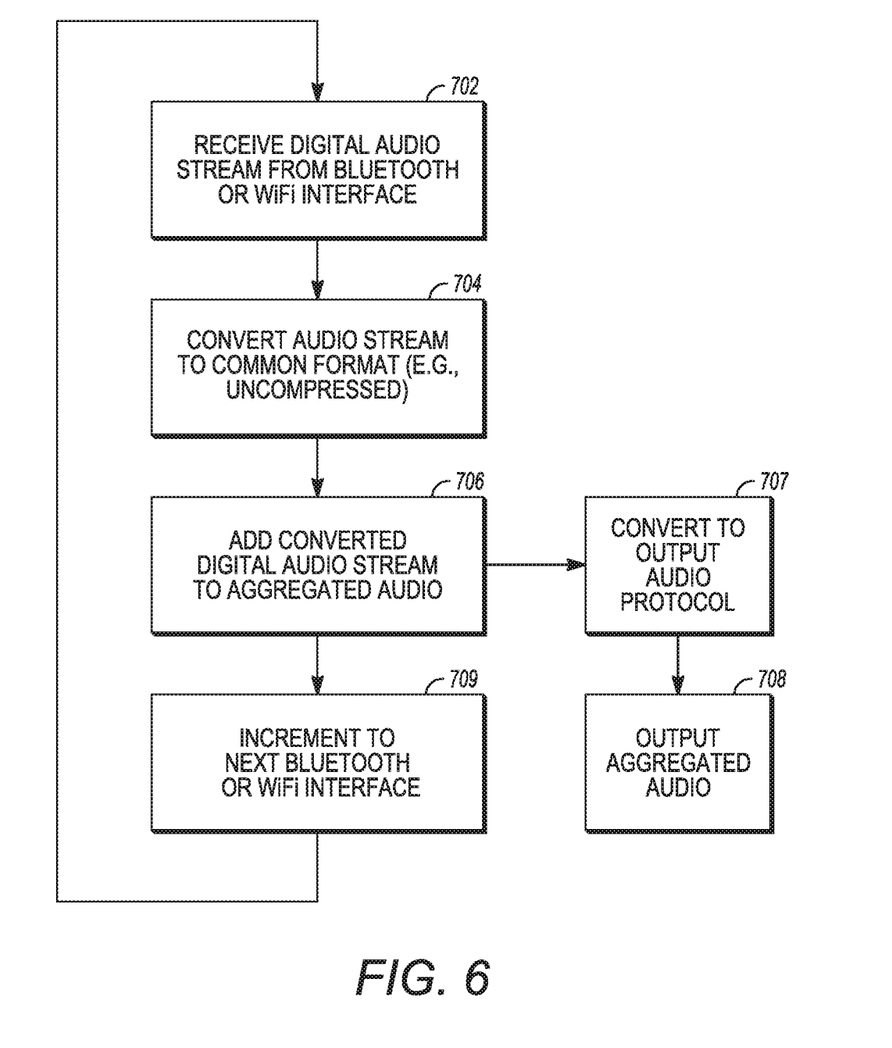
FIG. 6 shows a method of normalizing audio from multiple sources into a single, summed audio stream, as performed by the Bluetooth and Wi-Fi audio aggregation point.

FIG. 6 shows a method of normalizing audio from multiple sources into a commonly formatted, single, digitally summed or aggregated audio stream, as performed by the Bluetooth and Wi-Fi audio aggregation point 400.

In particular, as shown in step 702 of FIG. 6, a digital audio stream is received from a synched Bluetooth or Wi-Fi interface 421-425.

In step 704, the digital audio stream is converted to a common digital audio format. While any digital audio format may serve as a common format, including straight binary, it is preferable that the digital audio stream be converted to an uncompressed format.

In step 706, the converted digital audio stream sample is added, or aggregated, with the digital audio stream otherwise being transmitted to the hearing aid or headset 110 of the user from the set-top 100.

In step 709, the audio aggregation point 400 increments to the next synched Bluetooth or Wi-Fi interface receiving an audio stream.

in step 707, the aggregated audio is converted to an appropriate digital audio output protocol, e.g., HDMI audio, then output from the set-top 100 in step 708 to the hearing aid or headset 110.

While the disclosed embodiments are described with respect to operation within a set-top, the present invention relates equally to operation in the cloud.

The embodiments disclosed herein are described with respect to use of compressed digitized audio streams. The invention relates equally to the transmission of any type compressed or uncompressed digitized audio. For instance, AAC audio can be implemented.

While the invention has been described with reference to the exemplary embodiments thereof, those skilled in the art will be able to make various modifications to the described embodiments of the invention without departing from the true spirit and scope of the invention.

The descriptions herein of operations performed by the electronic apparatuses constitute algorithms and such algorithms can be realized as a computer program on a non-transitory computer readable medium readable by applicable electronic devices serving as the computer.

What is claimed is:

1. An electronic apparatus comprising:
a video stream demultiplexing system to provide video media to a media device;
a plurality of wireless interfaces connected to the video stream demultiplexing system that synch to respective user devices capable of generating an alert tone and of outputting a digital audio stream, wherein at least one of the user devices is configured to communicate with a control device using Internet Protocol communications, and the user device selectively includes an alert tone in its respective digital audio stream;
a wireless headset interface that synchs with a wireless-capable hearing device; and
a digital audio aggregation device, in communication with the wireless interfaces and the wireless headset interface, to digitally aggregate audio streams provided by the plural user devices via the plural wireless interfaces into an aggregated audio stream, and to output the aggregated audio stream to the wireless headset interface,
wherein the user devices are included in a local area network connected through the plurality of wireless interfaces.

2. The electronic apparatus according to claim 1, wherein at least one of the plurality of wireless interfaces is a Bluetooth interface.

3. The electronic apparatus according to claim 1, wherein at least one of the plurality of wireless interfaces is a Wi-Fi interface.

4. The electronic apparatus according to claim 1, wherein:
the digital audio aggregation device adjusts a volume of the aggregated digital audio stream before outputting the aggregated digital audio stream; and
the adjusted volume of the aggregated digital audio stream is set according to information from the wireless-capable hearing device.

5. The electronic apparatus according to claim 1, wherein: the hearing device is a hearing aid for a hearing impaired user.

6. The electronic apparatus according to claim 1, wherein: the hearing device is a headset.

7. The electronic apparatus according to claim 1, wherein the plurality of user devices includes a washer.

8. The electronic apparatus according to claim 1, wherein the plurality of user devices includes a dryer.

9. The electronic apparatus according to claim 1, wherein the plurality of user devices includes an oven.

10. The electronic apparatus according to claim 1, wherein the plurality of user devices includes a stereo.

11. The electronic apparatus according to claim 1, wherein:
the plurality of user devices includes a home security system; and
the digital aggregation device aggregates a digital audio stream output by the home security system together with respective digital audio streams output by each of the plurality of user devices.

12. A method of aggregating a plurality of digital audio streams for providing the digital audio streams directly to a personal hearing device of a user, comprising:
synching, via a plurality of wireless interfaces, to a respective plurality of user devices capable of generating an alert tone and of outputting a digital audio stream, wherein at least one of the user devices is configured to communicate with a control device using Internet Protocol communications, and the user device selectively includes an alert tone in its respective digital audio stream;
synching, via a wireless headset interface, to a wireless-capable hearing device;
aggregating digital audio streams provided by the plural user devices via the plural wireless interfaces, to create an aggregated audio stream; and
outputting the aggregated audio stream to the wireless-capable hearing device via the wireless headset interface,
wherein the user devices are included in a local area network connected through the plurality of wireless interfaces.

13. The method according to claim 12, further comprising:
synching, via a wireless interface, to a home security system;
wherein the aggregating the digital audio stream includes aggregating a digital audio stream output by the home security system together with respective digital audio streams output by the plurality of user devices.

14. The method according to claim 12, wherein the aggregating the digital audio stream includes aggregating a digital audio stream output by a media source.

15. The method according to claim 12, further comprising:
adjusting a volume of the aggregated digital audio stream before outputting the aggregated digital audio stream;
wherein the adjusted volume of the aggregated digital audio stream is set according to information from the wireless-capable hearing device.

16. The method according to claim 12, wherein the plurality of digital audio streams includes a digital audio stream that has an audio alert from a home security system.

17. A non-transitory computer-readable medium having stored thereon a program for causing a computer to execute a method comprising:
synching, via a plurality of wireless interfaces, to a respective plurality of user devices capable of generating an alert tone and of communicating with a control device using Internet Protocol communications, and capable of outputting a digital audio stream, wherein at least one of the user devices selectively includes an alert tone in its respective digital audio stream;
synching, via a wireless headset interface, to a wireless-capable hearing device;
aggregating digital audio streams provided by the plural user devices via the plural wireless interfaces, to create an aggregated audio stream; and
outputting the aggregated audio stream to the wireless-capable hearing device via the wireless headset interface,
wherein the user devices are included in a local area network connected through the plurality of wireless interfaces.

18. The non-transitory computer-readable medium according to claim 17, further comprising:
synching, via a wireless interface, to a home security system;
wherein the aggregating the digital audio stream includes aggregating a digital audio stream output by the home security system together with respective digital audio streams output by the plurality of user devices.

19. The non-transitory computer-readable medium according to claim 17, wherein the aggregating the digital audio stream includes aggregating a digital audio stream output by a media source.

20. The non-transitory computer-readable medium according to claim 17, further comprising:
adjusting a volume of the aggregated digital audio stream before outputting the aggregated digital audio stream;
wherein the adjusted volume of the aggregated digital audio stream is set according to information from the wireless-capable hearing device.

21. The non-transitory computer-readable medium according to claim 17, wherein the plurality of digital audio streams includes a digital audio stream that has an audio alert from a home security system.

* * * * *